United States Patent
Young, Jr. et al.

(10) Patent No.: US 11,721,143 B1
(45) Date of Patent: Aug. 8, 2023

(54) VEHICLE RECOGNITION BASED ON SOUND DURING OPERATION

(71) Applicant: Capital One Services, LLC, McLean, VA (US)

(72) Inventors: Michael Anthony Young, Jr., Henrico, VA (US); Christopher McDaniel, Glen Allen, VA (US); Matthew Louis Nowak, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/811,811

(22) Filed: Jul. 11, 2022

(51) Int. Cl.
   *G07C 5/08* (2006.01)
   *G06N 5/022* (2023.01)
(52) U.S. Cl.
   CPC .......... *G07C 5/0841* (2013.01); *G06N 5/022* (2013.01); *G07C 5/0825* (2013.01)
(58) Field of Classification Search
   CPC ..... G07C 5/0841; G07C 5/0825; G06N 5/022
   See application file for complete search history.

(56) References Cited

U.S. PATENT DOCUMENTS

| | | | | |
|---|---|---|---|---|
| 2014/0266789 | A1* | 9/2014 | Matus | H04Q 9/00 340/870.07 |
| 2015/0278933 | A1* | 10/2015 | Barfield, Jr. | G06Q 30/08 705/26.3 |
| 2017/0142556 | A1* | 5/2017 | Matus | H04W 4/40 |
| 2018/0074034 | A1* | 3/2018 | Jones | G07C 5/008 |
| 2022/0215378 | A1* | 7/2022 | Dhama | G07C 5/0816 |

* cited by examiner

*Primary Examiner* — Sizo B Vilakazi
(74) *Attorney, Agent, or Firm* — Perkins Coie LLP

(57) ABSTRACT

Methods and systems are described herein for generating vehicle profiles for detected vehicles based on engine sound recordings. Based on those vehicle profiles, an enterprise is enabled to generate a user profile for customers. To generate the vehicle profile, a vehicle profiling system may be used. The vehicle profiling system may receive sound data with range information. The vehicle profiling system may input the sound data into a trained machine learning model and receive vehicle model information for the sound data. Based on the output, the profiling system may retrieve metadata associated with the vehicle model and generate a profile based on the metadata.

20 Claims, 7 Drawing Sheets

| Model | Year | Distance | Original Value | Current Value |
|---|---|---|---|---|
| BMW x5 | 2019 | 50 yards | 76,000 | 55,000 |

300 — 303 (Model), 306 (Year), 309 (Distance), 312 (Original Value), 315 (Current Value)

FIG. 3

VEHICLE RECOGNITION BASED ON SOUND DURING OPERATION

BACKGROUND

Many enterprises have been creating profiles for their patrons. User profiles enable enterprises to understand their users and thereby determine how their users utilize their products. Furthermore, user profiles enable enterprises to more effectively identify the type of users the enterprise has and how to best target user acquisition activities. In many cases, enterprises mine their client databases for profile data for generating those user profiles. However, there are many difficulties with creating and maintaining user profiles. For example, there are various regulations on the kind of information an enterprise is allowed to collect, store, and share with third parties when running user acquisition activities. Moreover, there is a possibility that a nefarious actor may steal that information. Thus, various restrictions must be placed and enforced on the collected data.

SUMMARY

Therefore, methods and systems are described herein for generating vehicle profiles for detected vehicles based on engine sound recordings. Based on those vehicle profiles, an enterprise is enabled to generate a user profile for customers. To generate the vehicle profile, a vehicle profiling system may be used. The vehicle profiling system may receive sound data with range information. The vehicle profiling system may input the sound data into a trained machine learning model and receive vehicle model information for the sound data. Based on the output, the vehicle profiling system may retrieve metadata associated with the vehicle model and generate a profile based on the metadata.

In particular, the vehicle profiling system may receive sound data detected by one or more sound devices. For example, an enterprise may set up one or more microphones in the vicinity of a location. The microphones may be configured to detect sounds around the location, including engine/vehicle sounds. Thus, each microphone may transmit sound data to the vehicle profiling system. The vehicle profiling system may receive the sound data and preprocess that data. In some embodiments, the sound data may include data from multiple microphones situated around the location. Thus, the vehicle profiling system may identify multiple segments in the sound data and separate those segments out.

The vehicle profiling system may then input, into a machine learning model, a range and at least a portion of the sound data to obtain a vehicle model of a vehicle and an indication that the vehicle is within the range. The machine learning model may be trained using a plurality of engine sound recordings to identify vehicle models and distances based on engine sound recording data. For example, the machine learning model may take, as an input, one of the sound recordings and a required range. Based on the input, the machine learning model may output the model of the vehicle detected within the sound recording and an indication whether the vehicle was detected within range.

For example, an enterprise may have one or more locations that enable users to visit. A particular location may be equipped with one or more microphones and/or other recording devices located on premises. The microphones may detect and capture sound data. That sound data may then be sent to the vehicle profiling system. The vehicle profiling system may preprocess the sound data and input that sound data into the machine learning model, as discussed above. The sound data may include engine (and other sound) detected from the vehicle as the vehicle is driven past one or more microphones.

In some embodiments, the machine learning model may be trained using vehicle sound data and range information. The vehicle profiling system may receive a dataset that includes a plurality of engine sound recordings associated with a plurality of vehicles, and, for each engine sound recording of the plurality of engine sound recordings, (1) a corresponding distance to each vehicle, and (2) a corresponding vehicle model of each vehicle. The vehicle profiling system may then train, using the dataset, the machine learning model to identify the vehicle models and distances based on engine sound recording data.

In some embodiments, the training may include a direction for each vehicle. That is, the dataset may include a corresponding direction to each vehicle. Thus, the machine learning model may be trained based on the corresponding direction to each vehicle. For example, each microphone setup around the location may include a device enabled to detect a direction associated with the detected sound. The direction may be recorded as metadata associated with the sound. For example, direction may be compass-based (e.g., south, east, west, north, northwest, etc.). In some embodiments, the direction may be stored as a number of degrees.

In response to receiving, from the machine learning model, the vehicle model and the indication that the vehicle is within the range, the vehicle profiling system may generate, based on the vehicle model, a vehicle profile associated with the vehicle. For example, the vehicle profile may include the model of the vehicle, the year, and other data associated with the vehicle (e.g., current value, original price, etc.). In some embodiments, the vehicle profiling system may request and receive other metadata associated with the vehicle model.

In some embodiments, the vehicle profile may be aggregated with other vehicle profiles to generate a customer profile for a customer visiting the location. In some embodiments, aggregation may be performed over different parameters within the profile (e.g., vehicle model, year, price, and/or a combination of those).

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 3 illustrates a data structure representing an excerpt from a vehicle profile, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
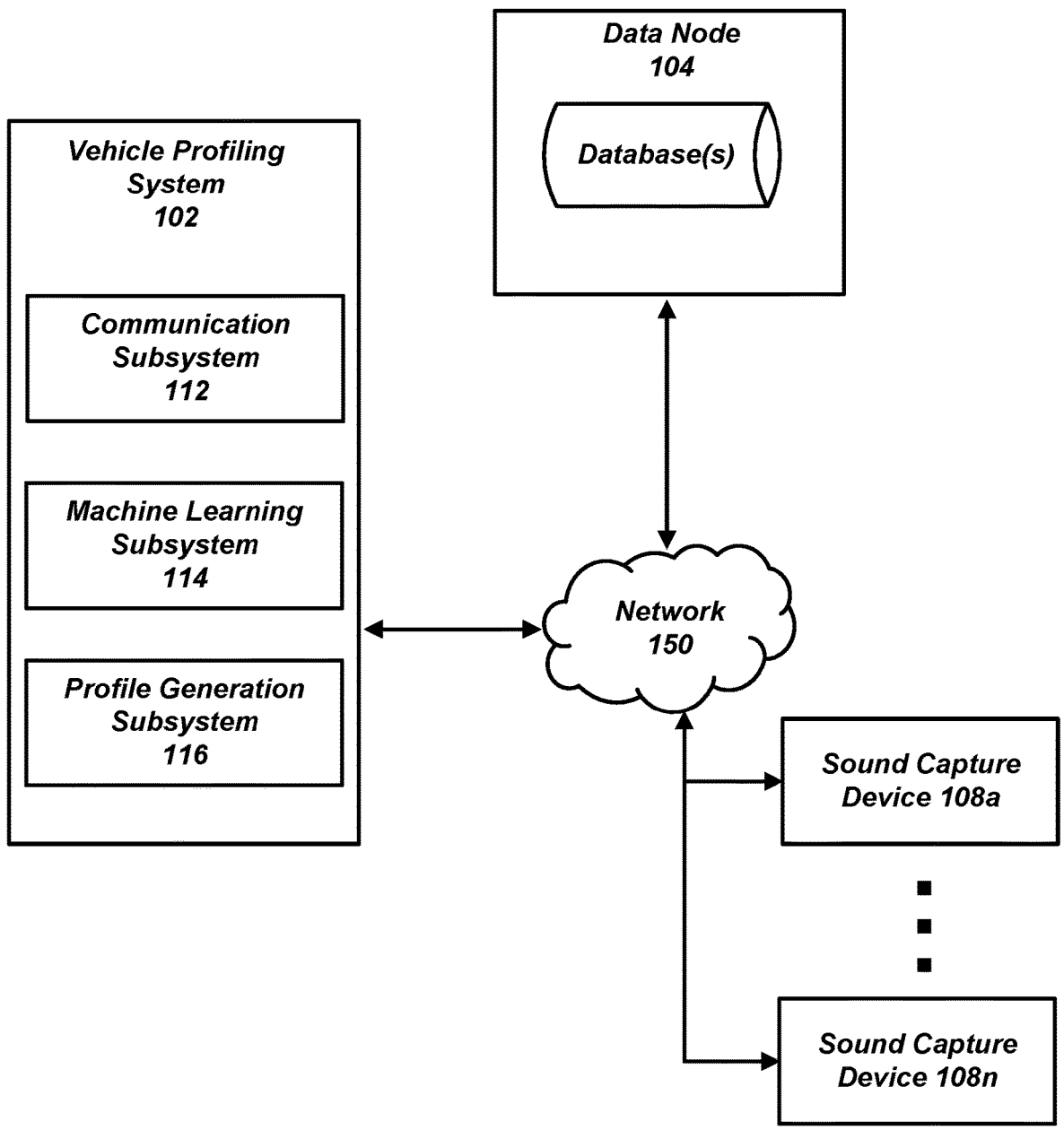
FIG. 1 shows an illustrative system for generating vehicle profiles for detected vehicles based on engine sound recordings, in accordance with one or more embodiments of this disclosure.

FIG. 1 is an example of environment 100 for generating vehicle profiles for detected vehicles based on engine sound recordings. Environment 100 includes vehicle profiling system 102, data node 104, and sound capture devices 108a-108n. In some embodiments, only one recording device may be used while in other embodiments multiple recording devices may be used. Vehicle profiling system 102 may execute instructions for generating vehicle profiles for detected vehicles based on engine sound recordings. Vehicle profiling system 102 may include software, hardware, or a combination of the two. For example, vehicle profiling system 102 may be a physical server or a virtual server that is running on a physical computer system. In some embodiments, vehicle profiling system 102 may be configured on a user device (e.g., a laptop computer, a smart phone, a desktop computer, an electronic tablet, or another suitable user device).

Data node 104 may store various data, including one or more machine learning models, training data, vehicle profiles, and/or other suitable data. In some embodiments, data node 104 may also be used to train the machine learning model. Data node 104 may include software, hardware, or a combination of the two. For example, data node 104 may be a physical server, or a virtual server that is running on a physical computer system. In some embodiments, vehicle profiling system 102 and data node 104 may reside on the same hardware and/or the same virtual server/computing device. Network 150 may be a local area network, a wide area network (e.g., the Internet), or a combination of the two. Sound capture devices 108a-108n may be end-user computing devices (e.g., desktop computers, laptops, electronic tablets, smart phones, and/or other computing devices used by end users) that may include microphone(s). In some embodiments, each sound capture device may be a microphone with circuitry built-in for transmitting the captured sounds. Furthermore, each sound capture device may include storage for recording detected sounds.

Vehicle profiling system 102 may receive sound data detected by one or more sound capture devices. Vehicle profiling system 102 may receive the sound data using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive the sound data from data node 104 or from another computing device. In some embodiments communication subsystem 112 may receive the sound data from one or more sound capture devices 108a-108n. Each sound capture device may be a microphone attached to a computing device enabling transmission of the data. In some embodiments, sound capture devices 108a-108n may be one or more microphones connected via a corresponding wire to vehicle profiling system 102. However, in some embodiments, the microphones may connect wirelessly to vehicle profiling system 102. Communication subsystem 112 may pass the sound, or a pointer to the sound data in memory, to machine learning subsystem 114.

Machine learning subsystem 114 may include software components, hardware components, or a combination of both. For example, machine learning subsystem 114 may include software components (e.g., API calls) that access one or more machine learning models. Machine learning subsystem 114 may access the sound data, for example, in memory. In some embodiments, the sound data may include multiple segments, for example, from multiple sound capture devices. That is, in some embodiments, a particular location may include a plurality of sound capture devices (e.g., a plurality of microphones) situated throughout the location (e.g., around an outside of a place of business). Thus, machine learning subsystem 114 may determine that the sound data includes a plurality of sound segments from a plurality of sound capture devices. Machine learning subsystem 114 may make that determination using metadata received together with the sound data. The metadata may indicate different identifiers for different sound capture devices as well as positions of those sound capture devices.

The sound capture devices may be located in such a way that multiple sound capture devices may detect the sound data (e.g., a vehicle engine/sound) and capture that sound data. In some embodiments, the capturing devices may be connected to a computing device that may receive the sound data and send the sound data (e.g., together with the metadata to vehicle profiling system 102). Thus, when vehicle profiling system 102 receives the sound data (e.g., via communication subsystem 112), vehicle profiling system 102 may determine (e.g., via machine learning subsystem 114) that the sound data includes a plurality of sound segments from a plurality of sound capture devices. For example, machine learning subsystem 114 may use metadata received with the sound data to determine a number of sound segments received.

Figure 2:
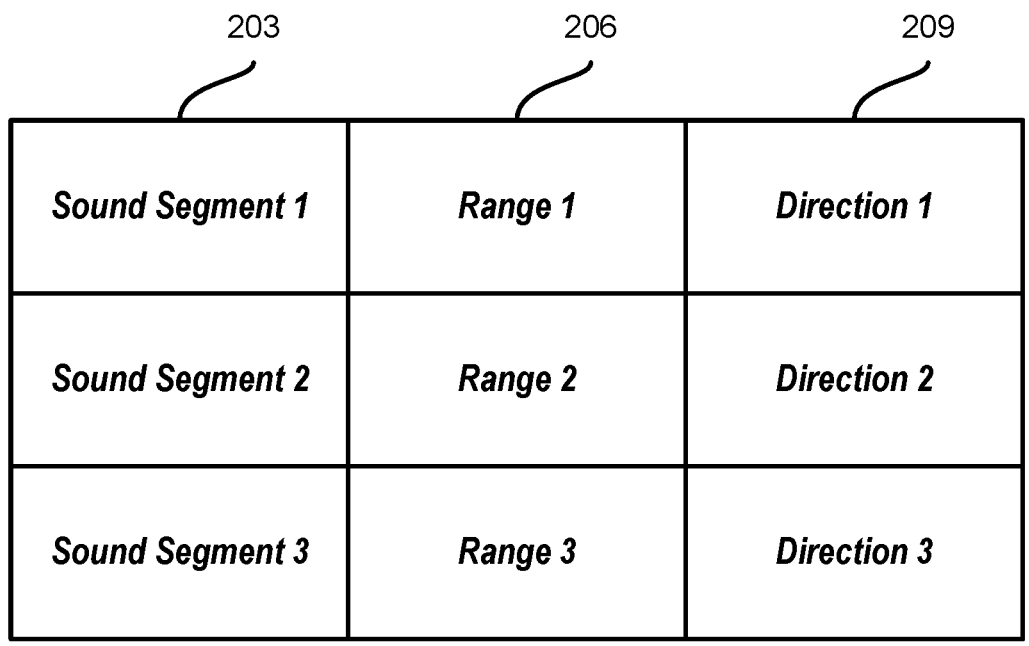
FIG. 2 illustrates a data structure for sound segments for input into a machine learning model, in accordance with one or more embodiments of this disclosure.

FIG. 2 illustrates a data structure 200 for storing sound segments for input into a machine learning model. Data structure 200 may include field 203 that stores the sound data itself. The sound data may be stored in a digital file containing a digital representation of the sound. Field 206 may include a range value for the sound segment. For example, the range may be retrieved from memory and/or from metadata received with the sound segments. The range indicates a distance from the sound capture device that a profile is to be built. That is, if the sound data is within the range, vehicle profiling system 102 may generate a vehicle profile. However, if the sound data is not within the range, vehicle profiling system 102 may not generate the vehicle profile, for example, because the vehicle is too far from the location and does not represent a vehicle of a customer of the location. Thus, vehicle profiling system 102 may separate the sound data into the plurality of sound segments (e.g., based on the metadata). Field 209 may indicate a direction of the sound. A direction may be a number of degrees/minutes and indicate from which direction the sound was received.

In some embodiments, every capturing device may be associated with a corresponding range. For example, based on a location of a particular sound capture device (e.g., a particular microphone), the range may be 50 yards. That is, in one example, if a sound of an engine is detected within 50 yards, that indicates that the detected vehicle is within the range. For example, a particular location (e.g., of a business) may have a microphone outside the building and a parking lot may be 50 yards long. Thus, if a vehicle is within 50 yards of the location, it may indicate that a customer has entered a parking lot.

When the sound data is received, vehicle profiling system 102 may use a machine learning model to determine a vehicle model of a vehicle and an indication whether the vehicle is within the range. Thus, vehicle profiling system 102 may input, into a machine learning model, a range and at least a portion of the sound data to obtain a vehicle model of a vehicle and an indication that the vehicle is within the range. For example, the input may be data field 203 and field 206. Based on the input the machine learning model may determine a vehicle model associated with the sound data and a distance between the sound capture device and the vehicle. The machine learning model may compare the distance and the range to determine whether the vehicle is within the range. Based on determining that the vehicle is within the range, the machine learning model may output the make and model of the vehicle and a value (e.g., a Boolean value) indicating whether the vehicle is within range.

In some embodiments, the machine learning model may take, as input, the sound segment and output a vehicle model (e.g., make and model such as 2019 BMW X5) and a distance from the sound capture device (e.g., 25 feet). Machine learning subsystem 114 may retrieve (e.g., from the metadata associated with the sound segment) a range (e.g., a range within which a valid profile is to be generated). Machine learning subsystem 114 may compare the range with the distance and determine whether to generate a vehicle profile for the vehicle. Thus, if the distance is within range, machine learning subsystem 114 may determine to generate the vehicle profile.

In some embodiments, machine learning subsystem 114 may receive multiple sound segments from multiple sound capture devices (e.g., as shown in FIG. 2). Thus, machine learning subsystem 114 may input, into the machine learning model, the range and each sound segment of the plurality of sound segments. Machine learning subsystem 114 may perform the inputs sequentially or simultaneously (e.g., using multiple instances of the machine learning model). Machine learning subsystem 114 may receive, from the machine learning model, a plurality of indications, indicating whether each sound segment is within the range. That is, the machine learning model may output the model and whether the vehicle is within range of the location (e.g., within range of a parking lot).

To describe a specific example, a particular location (e.g., a business) may have three different sound capture devices (e.g., microphones) located on the three different sides of the business. Each sound capture device may have a particular range indicating that a vehicle is parked near a business. For example, a first sound capture device may be stationed in the back of the location (e.g., back of the business) that has a large parking lot (e.g., 50 yards long and 50 yards wide. Thus, the first sound capture device may have a range of 50 yards. In addition, a second sound capture device may be stationed in the front of the location (e.g., in front of the business). In the front, the location may have a limited number of parking spots (e.g., five parking spaces immediately in front of the location. Thus, the range for the second sound capture device may be 10 yards. A third sound capture device may be located on the side of the location (e.g., side of the business) and have a medium size parking lot available. Thus, the range of the third sound capture device may be 20 yards.

In this example, the machine learning model may output a negative determination as to whether the sound data is within range for two sound capture devices and a positive determination from a third sound capture device. For example, a customer's vehicle may be detected when it is parked 40 yards away in the back of the location. Thus, sound capture devices two and three may determine that the sound data indicates a vehicle outside the range (based on their respective ranges) while the first sound capture device may indicate that the vehicle is within range. In some embodiments, the machine learning model may output the vehicle model and the distance for each sound segment. In those instances, machine learning subsystem 114 may compare the distances with the ranges (e.g., a range associated with each sound capture device) and determine for each sound capture device whether the sound data is within range. In some embodiments, the machine learning model may also receive a direction (e.g., a direction where the sound originated) and use the direction to determine the output of the machine learning model.

In response to receiving from the machine learning model the vehicle model and the indication that the vehicle is within the range, vehicle profiling system (e.g., via profile generation subsystem 116) may generate, based on the vehicle model, a vehicle profile associated with the vehicle. Profile generation subsystem 116 may include software components, hardware components, or a combination of both. For example, profile generation subsystem 116 may include software components that access data in memory and/or storage, and may use one or more processors to perform its operations. In some embodiments, profile generation subsystem 116 retrieves a plurality of attributes associated with the vehicle model. For example, each vehicle model may have an associated set of attributes (e.g., stored on data node 104). Profile generation subsystem 116 may retrieve those attributes. Profile generation subsystem 116 may add the plurality of attributes to the vehicle profile. For example, profile generation subsystem 116 may generate a data structure and store that data structure (e.g., on data node 104).

FIG. 3 illustrates a data structure 300 representing an excerpt from a vehicle profile. Field 303 may store a make and model associated with the vehicle (e.g., BMW X5). Field 306 may store a year the vehicle was made. Field 309 may store a distance between the capturing device and the vehicle. Field 312 may store the original value of the vehicle, while field 315 may store a current value of the vehicle. Other fields may be included in the profile while some fields may be removed from the profile. In some embodiments, vehicle profiling system 102 may generate a signature associated with a particular vehicle (e.g., based on the sound data). Thus, vehicle profiling system 102 may identify various locations that the vehicle has visited. Thus, the vehicle profile may include one or more locations in which the vehicle was detected and for each location, a corresponding distance.

In some embodiments, vehicle profiling system 102 (e.g., via profile generation subsystem 116) may aggregate the vehicle profile associated with the vehicle with other vehicle profiles associated with other vehicles detected within the range. In some embodiments, profile generation subsystem 116 may identify, within the vehicle profile and other vehicle profiles, a plurality of fields with numeric values (e.g., field 312 and/or field 315). Profile generation subsystem 116 may generate one or more aggregation metrics for each field. For example, for field 312, profile generation subsystem 116 may generate a maximum value, a minimum value, a range of values, an average value, etc.). In some embodiments, profile generation subsystem 116 may generate other values for the aggregated profile (e.g., range of models, range of years made, etc.). Thus, profile generation subsystem 116 may generate an aggregated profile based on the vehicle profile and the other vehicle profiles.

In some embodiments, vehicle profiling system 102 may generate advertisements based on the vehicle profile and/or the aggregated profile. For example, the advertisement may be generated based on the aggregated profile when an entity desires to acquire more customers. In some embodiments, vehicle profiling system 102 may generate and display an advertisement to the vehicle's occupant(s) based on the vehicle profile. Thus, vehicle profiling system 102 may determine, based on a distance and a direction associated with the sound data, a display within visibility field of the vehicle. For example, the location may have a number of displays located in the vicinity. Each display may be associated with a particular parking area and may be visible from that parking area. Thus, vehicle profiling system 102 may determine, based on a distance and a direction associated with the sound data, a display within visibility field of the vehicle. As illustrated in FIG. 2, sound data may include field 209 which may indicate a direction of the detected vehicle. Vehicle profiling system 102 may retrieve the direction and also the distance (e.g., from vehicle profile as illustrated in FIG. 3.) Based on the direction and the distance, vehicle profiling system 102 may determine whether the display would be visible from the vehicle. Vehicle profiling system 102 may then generate for display, on the display, vehicle data associated with the vehicle model. For example, the vehicle data may include an advertisement associated with that vehicle. In some embodiments, vehicle data may be a make and model of the vehicle and an advertisement related to the vehicle (e.g., an offer for a new vehicle). In some embodiments, the machine leaning model may also output a direction (e.g., a direction from which the sound originated).

Figure 4:
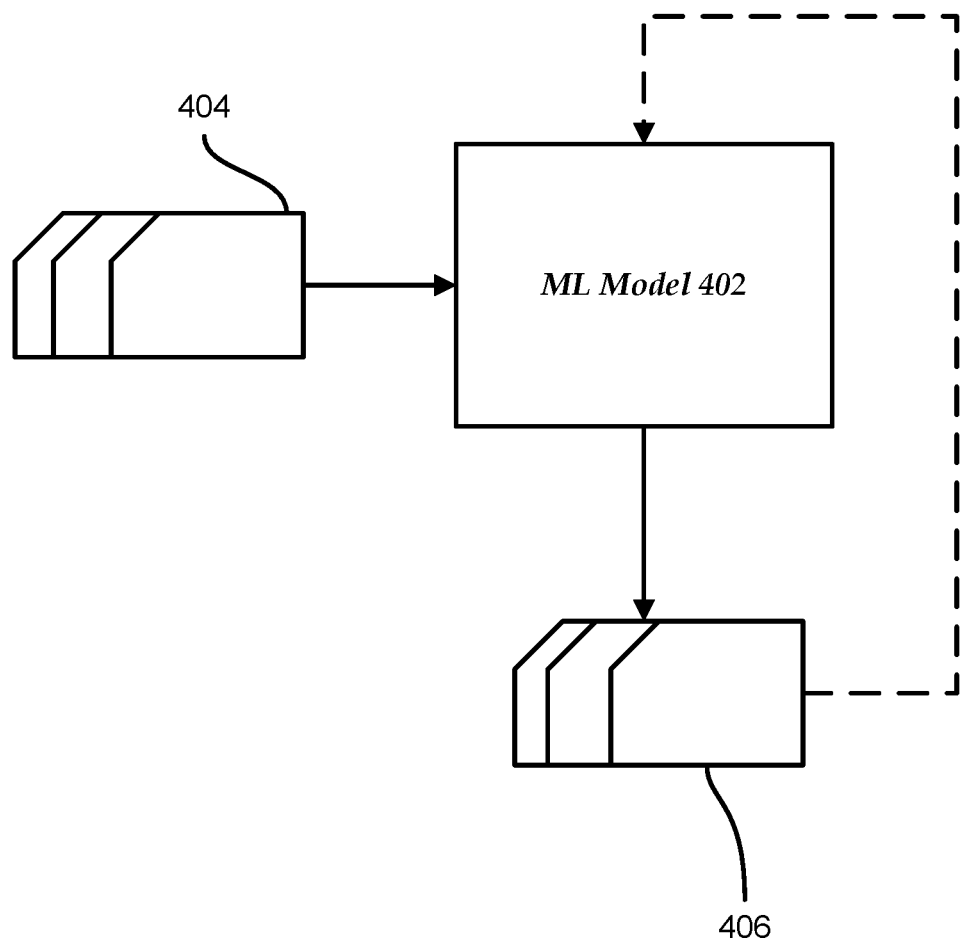
FIG. 4 illustrates an exemplary machine learning model, in accordance with one or more embodiments of this disclosure.

FIG. 4 illustrates an exemplary machine learning model. The machine learning model may have been trained using a plurality of engine sound recordings to identify vehicle models and distances based on engine sound recording data. Machine learning model 402 may take input 404 (e.g., sound data described above) and may output vehicle model and an indication whether the vehicle is within range. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, machine learning subsystem 114 may train the machine learning model. Machine learning subsystem 114 may receive a dataset that includes a plurality of engine sound recordings associated with a plurality of vehicles. Each engine sound recording of the plurality of engine sound recordings may include a corresponding distance to the vehicle, and a corresponding vehicle model of the vehicle. In some embodiments, the engine sound recording may include other mechanical sounds generated by a vehicle during vehicle operation.

Figure 5:
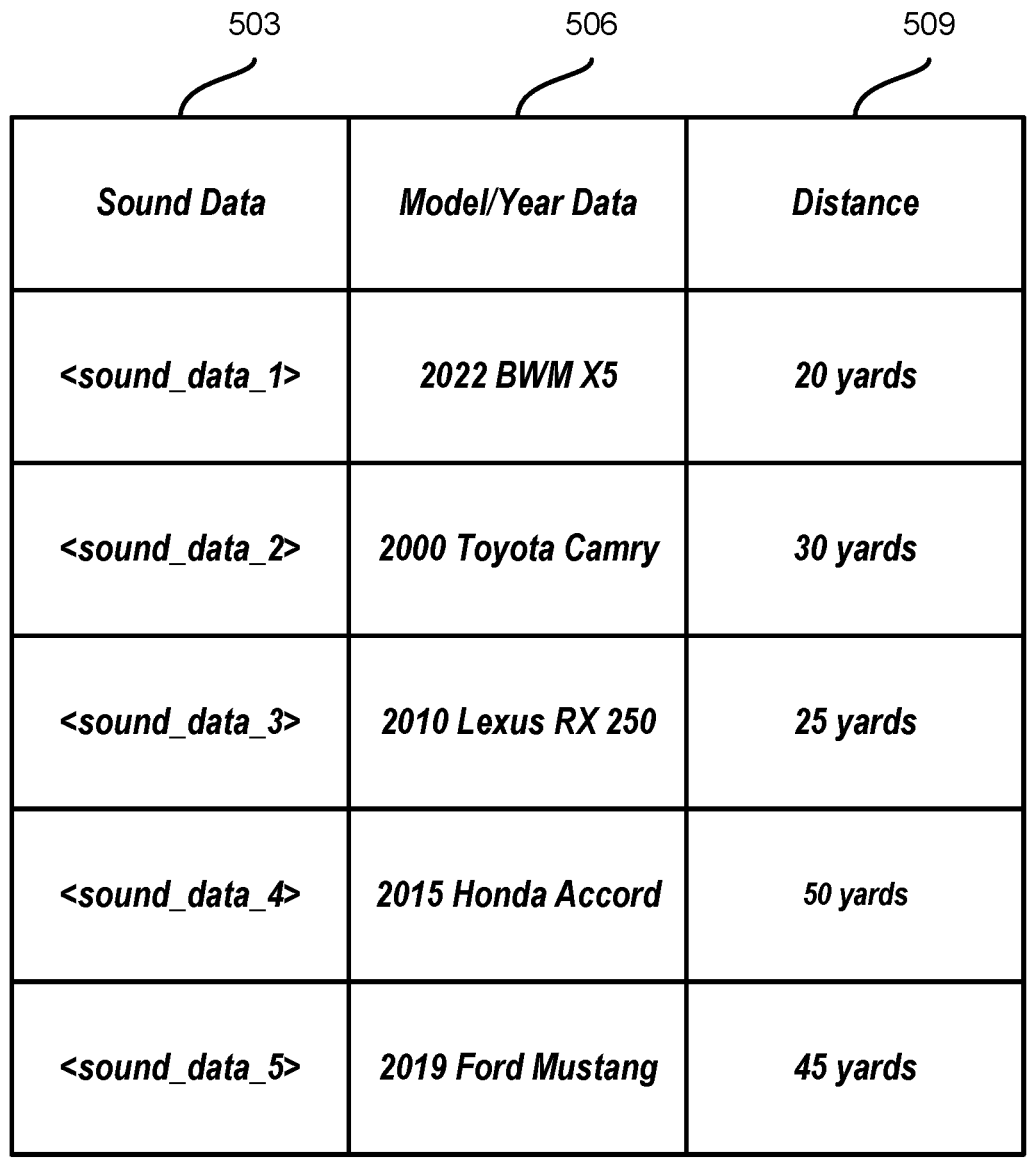
FIG. 5 illustrates a table that may store training data from training the machine learning model, in accordance with one or more embodiments of this disclosure.

FIG. 5 illustrates an excerpt of dataset 500 that includes a plurality of features for training a machine learning model. Field 503 may include sound data for each vehicle. The sound data may be mechanical sounds generated by a vehicle while the vehicle is operating. Field 506 may include make, model, and/or year of the vehicle, while field 509 may include the distance at which the sound data is captured. In some embodiments, for each vehicle, there may be multiple entries within dataset 500 such that each entry includes data for a different distance. In some embodiments, the dataset may include a direction of the sound data (e.g., from which direction the sound originated). Machine learning system 114 may initiate the training routine of the machine learning model. The training routine may train the machine learning model, using (1) the plurality of engine sound recordings, (2) the corresponding distance to each vehicle, and (3) the corresponding vehicle model. After training, the machine learning model may be enabled to identify vehicle models and distances based on engine sound recording data.

Computing Environment

Figure 6:
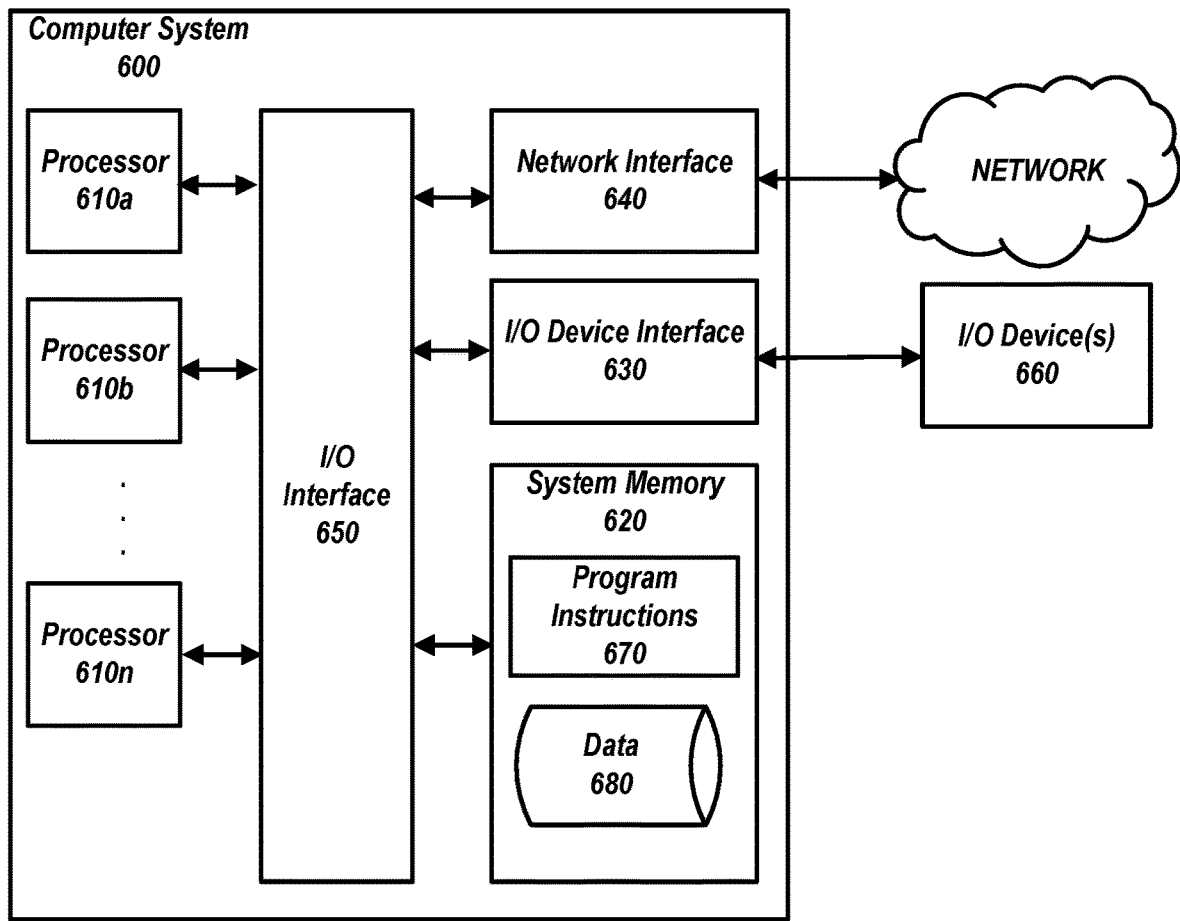
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
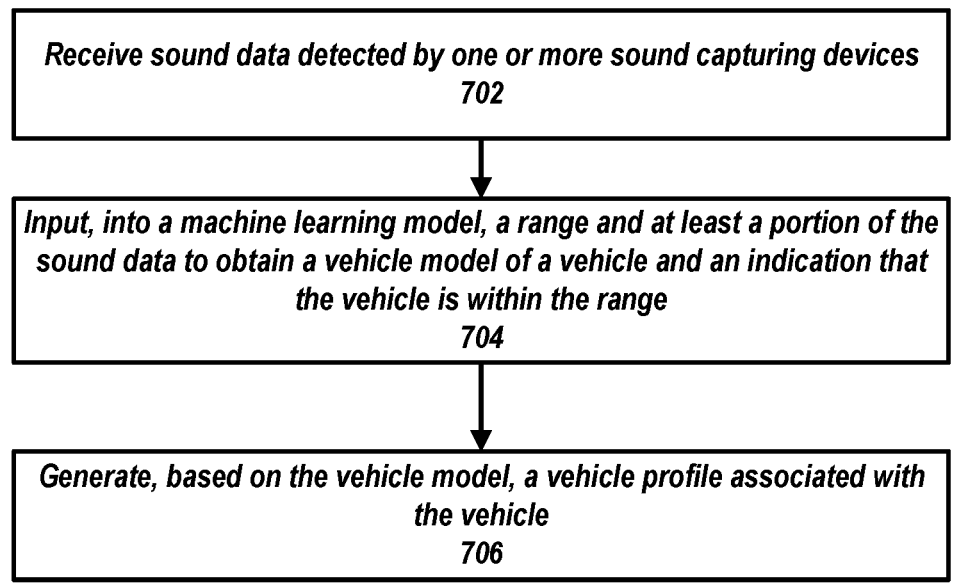
FIG. 7 is a flowchart of operations for generating vehicle profiles for detected vehicles based on engine sound recordings, in accordance with one or more embodiments of this disclosure.

FIG. 7 is a flowchart 700 of operations for generating vehicle profiles for detected vehicles based on engine sound recordings. The operations of FIG. 7 may use components described in relation to FIG. 6. In some embodiments, vehicle profiling system 102 may include one or more components of computer system 600. At 702, vehicle profiling system 102 receives sound data detected by one or more sound capturing devices. For example, the vehicle profiling system 102 may receive the sound data from data node 104 or from one of sound capture devices 108a-108n. Vehicle profiling system 102 may receive the sound data over network 150 using network interface 640.

At 704, vehicle profiling system 102 inputs, into a machine learning model, a range and at least a portion of the sound data to obtain a vehicle model of a vehicle and an indication that the vehicle is within the range. Vehicle profiling system 102 may use one or more processors 610a, 610b, and/or 610n to perform the determination. At 706, vehicle profiling system 102 generates, based on the vehicle model, a vehicle profile associated with the vehicle. For example, vehicle profiling system 102 may use one or more processors 610a-610n to perform the operation and store the results in system memory 620.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating vehicle profiles for detected vehicles based on engine sound recordings, the method comprising: receiving sound data detected by one or more sound capturing devices; inputting, into a machine learning model, a range and at least a portion of the sound data to obtain a vehicle model of a vehicle and an indication that the vehicle is within the range, wherein the machine learning model has been trained using a plurality of engine sound recordings to identify vehicle models and distances based on engine sound recording data; and in response to receiving, from the machine learning model, the vehicle model and the indication that the vehicle is within the range, generating, based on the vehicle model, a vehicle profile associated with the vehicle.

2. Any of the preceding embodiments, further comprising: receiving a dataset comprising the plurality of engine sound recordings associated with a plurality of vehicles, and, for each engine sound recording of the plurality of engine sound recordings, (1) a corresponding distance to each vehicle, and (2) a corresponding vehicle model; and training, using (1) the plurality of engine sound recordings, (2) the corresponding distance to each vehicle, and (3) the corresponding vehicle model, the machine learning model to identify the vehicle models and distances based on engine sound recording data.

3. Any of the preceding embodiments, wherein the dataset comprises a corresponding direction to each vehicle, and wherein the machine learning model is trained based on the corresponding direction to each vehicle.

4. Any of the preceding embodiments, further comprising: determining, based on a distance and a direction associated with the sound data, a display within visibility field of the vehicle; and generating for display, on the display, vehicle data associated with the vehicle model.

5. Any of the preceding embodiments, further comprising: aggregating the vehicle profile associated with the vehicle with other vehicle profiles associated with other vehicles detected within the range; and generating an aggregated profile based on the vehicle profile and the other vehicle profiles.

6. Any of the proceeding embodiments, further comprising: determining that the sound data comprises a plurality of sound segments from a plurality of sound capturing devices; and separating the sound data into the plurality of sound segments.

7. Any of the preceding embodiments, wherein inputting, into the machine learning model, the range and at least the portion of the sound data to obtain the vehicle model of the vehicle and the indication that the vehicle is within the range comprises: inputting, into the machine learning model, the range and each sound segment of the plurality of sound segments; receiving, from the machine learning model, a plurality of indications, indicating whether each sound segment is within the range; and adding, to the vehicle profile, a range of locations associated with the vehicle.

8. Any of the preceding embodiments, wherein generating the vehicle profile associated with the vehicle comprises: retrieving a plurality of attributes associated with the vehicle model; and adding the plurality of attributes to the vehicle profile.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for generating vehicle profiles for detected vehicles based on engine sound recordings, the system comprising:
  one or more processors; and
  a non-transitory computer-readable storage medium storing instructions, which when executed by the one or more processors cause the one or more processors to perform operations comprising:
    receiving a dataset comprising a plurality of engine sound recordings associated with a plurality of vehicles collected by a device external to a corresponding vehicle, and, for each engine sound recording of the plurality of engine sound recordings, (1) a corresponding distance to each vehicle, and (2) a corresponding vehicle model;
    training, using (1) the plurality of engine sound recordings, (2) the corresponding distance to each vehicle, and (3) the corresponding vehicle model, a machine learning model to identify vehicle models and distances based on engine sound recording data;
    collecting sound data using a microphone external to a vehicle;
    inputting, into the machine learning model a range and at least a portion of the sound data to obtain a vehicle model of the vehicle and an indication that the vehicle is within the range; and
    in response to receiving, from the machine learning model, the vehicle model and the indication that the vehicle is within the range, generating, based on the vehicle model, a vehicle profile associated with the vehicle.

2. The system of claim 1, wherein the instructions further cause the one or more processors to perform operations comprising:
  aggregating the vehicle profile associated with the vehicle with other vehicle profiles associated with other vehicles detected within the range; and
  generating an aggregated profile based on the vehicle profile and the other vehicle profiles.

3. The system of claim 1, wherein the dataset comprises a corresponding direction between the device external to each vehicle and each vehicle, and wherein the machine learning model is trained based on the corresponding direction to each vehicle.

4. The system of claim 3, wherein the instructions further cause the one or more processors to perform operations comprising:
  determining, based on a distance and a direction associated with the sound data, a display within visibility field of the vehicle; and
  generating for display, on the display, vehicle data associated with the vehicle model.

5. A method for generating vehicle profiles for detected vehicles based on engine sound recordings, the method comprising:
  receiving sound data detected by one or more sound capturing devices external to a vehicle;
  inputting, into a machine learning model, a range and at least a portion of the sound data to obtain a vehicle model of the vehicle and an indication that the vehicle is within the range, wherein the machine learning model has been trained using a plurality of engine sound recordings to identify vehicle models and distances based on engine sound recording data; and
  in response to receiving, from the machine learning model, the vehicle model and the indication that the vehicle is within the range, generating, based on the vehicle model, a vehicle profile associated with the vehicle.

6. The method of claim 5, further comprising:
  receiving a dataset comprising the plurality of engine sound recordings associated with a plurality of vehicles, and, for each engine sound recording of the plurality of engine sound recordings, (1) a corresponding distance to each vehicle, and (2) a corresponding vehicle model; and
  training, using (1) the plurality of engine sound recordings, (2) the corresponding distance to each vehicle, and (3) the corresponding vehicle model, the machine learning model to identify the vehicle models and distances based on engine sound recording data.

7. The method of claim 6, wherein the dataset comprises a corresponding direction to each vehicle, and wherein the machine learning model is trained based on the corresponding direction to each vehicle.

8. The method of claim 7, further comprising:
  determining, based on a distance and a direction associated with the sound data, a display within visibility field of the vehicle; and
  generating for display, on the display, vehicle data associated with the vehicle model.

9. The method of claim 5, further comprising:
aggregating the vehicle profile associated with the vehicle with other vehicle profiles associated with other vehicles detected within the range; and
generating an aggregated profile based on the vehicle profile and the other vehicle profiles.

10. The method of claim 5, further comprising:
determining that the sound data comprises a plurality of sound segments from a plurality of sound capturing devices; and
separating the sound data into the plurality of sound segments.

11. The method of claim 10, wherein inputting, into the machine learning model, the range and at least the portion of the sound data to obtain the vehicle model of the vehicle and the indication that the vehicle is within the range comprises:
inputting, into the machine learning model, the range and each sound segment of the plurality of sound segments;
receiving, from the machine learning model, a plurality of indications, indicating whether each sound segment is within the range; and
adding, to the vehicle profile, a range of locations associated with the vehicle.

12. The method of claim 5, wherein generating the vehicle profile associated with the vehicle comprises:
retrieving a plurality of attributes associated with the vehicle model; and
adding the plurality of attributes to the vehicle profile.

13. A non-transitory, computer-readable medium storing instructions that, when executed by one or more processors, cause the one or more processors to perform operations comprising:
receiving sound data detected by one or more sound capturing devices external to a vehicle;
inputting, into a machine learning model, a range and at least a portion of the sound data to obtain a vehicle model of the vehicle and an indication that the vehicle is within the range, wherein the machine learning model has been trained using a plurality of engine sound recordings to identify vehicle models and distances based on engine sound recording data; and
in response to receiving, from the machine learning model, the vehicle model and the indication that the vehicle is within the range, generating, based on the vehicle model, a vehicle profile associated with the vehicle.

14. The non-transitory, computer-readable medium of claim 13, wherein the instructions further cause the one or more processors to perform operations comprising:
receiving a dataset comprising the plurality of engine sound recordings associated with a plurality of vehicles, and, for each engine sound recording of the plurality of engine sound recordings, (1) a corresponding distance to each vehicle, and (2) a corresponding vehicle model; and
training, using (1) the plurality of engine sound recordings, (2) the corresponding distance to each vehicle, and (3) the corresponding vehicle model, the machine learning model to identify the vehicle models and distances based on engine sound recording data.

15. The non-transitory, computer-readable medium of claim 14, wherein the dataset comprises a corresponding direction to each vehicle, and wherein the machine learning model is trained based on the corresponding direction to each vehicle.

16. The non-transitory, computer-readable medium of claim 15, wherein the instructions further cause the one or more processors to perform operations comprising:
determining, based on a distance and a direction associated with the sound data, a display within visibility field of the vehicle; and
generating for display, on the display, vehicle data associated with the vehicle model.

17. The non-transitory, computer-readable medium of claim 13, wherein the instructions further cause the one or more processors to perform operations comprising:
aggregating the vehicle profile associated with the vehicle with other vehicle profiles associated with other vehicles detected within the range; and
generating an aggregated profile based on the vehicle profile and the other vehicle profiles.

18. The non-transitory, computer-readable medium of claim 13, wherein the instructions further cause the one or more processors to perform operations comprising:
determining that the sound data comprises a plurality of sound segments from a plurality of sound capturing devices; and
separating the sound data into the plurality of sound segments.

19. The non-transitory, computer-readable medium of claim 18, wherein the instructions for inputting, into the machine learning model, the range and at least the portion of the sound data to obtain the vehicle model of the vehicle and the indication that the vehicle is within the range further cause the one or more processors to perform operations comprising:
inputting, into the machine learning model, the range and each sound segment of the plurality of sound segments;
receiving, from the machine learning model, a plurality of indications, indicating whether each sound segment is within the range; and
adding, to the vehicle profile, a range of locations associated with the vehicle.

20. The non-transitory, computer-readable medium of claim 13, wherein the instructions for generating the vehicle profile associated with the vehicle further cause the one or more processors to perform operations comprising:
retrieving a plurality of attributes associated with the vehicle model; and
adding the plurality of attributes to the vehicle profile.

* * * * *